US012812525B2

(12) United States Patent
Xie et al.

(10) Patent No.: US 12,812,525 B2
(45) Date of Patent: Nov. 24, 2026

(54) METHODS AND APPARATUS FOR ACCESS POINT SELECTION

(71) Applicant: QUALCOMM Incorporated, San Diego, CA (US)

(72) Inventors: Kun Xie, Yangpu (CN); Xin Deng, ShangHai (CN); Wensong Li, Shanghai (CN); Chenming Huang, Shanghai (CN); Longtao Wu, ShangHai (CN); Huashan Qu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/706,170

(22) PCT Filed: Jan. 19, 2022

(86) PCT No.: PCT/CN2022/072646

§ 371 (c)(1),
(2) Date: Apr. 30, 2024

(87) PCT Pub. No.: WO2023/137606

PCT Pub. Date: Jul. 27, 2023

(65) Prior Publication Data

US 2024/0430791 A1 Dec. 26, 2024

(51) Int. Cl.
*H04W 48/20* (2009.01)
*H04W 12/08* (2021.01)

(52) U.S. Cl.
CPC .......... *H04W 48/20* (2013.01); *H04W 12/08* (2013.01)

(58) Field of Classification Search
CPC .............................. H04W 48/20; H04W 12/08
USPC .......................................................... 455/434
See application file for complete search history.

(56) References Cited

U.S. PATENT DOCUMENTS

| | | | | |
|---|---|---|---|---|
| 9,894,580 B1 | 2/2018 | Chen et al. | | |
| 9,894,604 B1 | 2/2018 | Tran et al. | | |
| 2005/0068928 A1* | 3/2005 | Smith | H04W 48/16 | 370/338 |

(Continued)

FOREIGN PATENT DOCUMENTS

| | | |
|---|---|---|
| CN | 109040958 A | 12/2018 |
| CN | 110677886 A | 1/2020 |
| CN | 111800318 A | 10/2020 |

OTHER PUBLICATIONS

Lamers E., et al., "Securing home Wi-Fi with WPA3 personal", 2021 IEEE 18th Annual Consumer Communications & Networking Conference (CCNC), Jan. 9, 2021, 8 pages, XP033885364, section E, p. 5, line 41—p. 6, line 20, figure 3.

(Continued)

*Primary Examiner* — Michael R Neff
(74) *Attorney, Agent, or Firm* — Polsinelli LLP

(57) ABSTRACT

This disclosure provides methods, devices and systems for wireless communication. The method generally includes selecting an access point (AP) from a plurality of candidate APs based on multiple factors associated with each of the plurality of candidate APs, the multiple factors including at least a congestion factor and a security factor, wherein a weight associated with the security factor for selecting the AP is greater than a weight associated with the congestion factor; and connecting to a network via the AP based on the selection.

22 Claims, 12 Drawing Sheets

(56) References Cited

U.S. PATENT DOCUMENTS

| | | | | |
|---|---|---|---|---|
| 2010/0054179 | A1 | 3/2010 | Meyer | |
| 2014/0079043 | A1 * | 3/2014 | Montemurro ..... | H04W 52/0216 370/338 |

OTHER PUBLICATIONS

Supplementary European Search Report—EP229210547—Search Authority—The Hague—Aug. 11, 2025.

WiFi Alliance: “WPA3 Specification Version 3.0”, Wi-Fi Alliance, Dec. 20, 2020, XP055891724, pp. 1-30.

International Search Report and Written Opinion—PCT/CN2022/072646—ISA/EPO—Aug. 1, 2022.

Lamers E., et al., “Securing home Wi-Fi with WPA3 personal”, 2021 IEEE 18th Annual Consumer Communications & Networking Conference (CCNC), Jan. 9, 2021, 8 pages.

* cited by examiner

700

METHODS AND APPARATUS FOR ACCESS POINT SELECTION

CROSS-REFERENCE TO RELATED APPLICATIONS

This application for Patent is a 371 of international Patent Application PCT/CN2022/072646, filed Jan. 19, 2022, which is hereby incorporated by referenced in its entirety and for all purposes.

FIELD

The present disclosure generally relates to systems and techniques for wireless communication. For example, aspects of the present disclosure relate to systems and techniques for selecting an access point (AP) for network connection.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

Certain aspects are directed towards a method for wireless communication. The method generally includes: selecting an access point (AP) from a plurality of candidate APs based on multiple factors associated with each of the plurality of candidate APs, the multiple factors including at least a congestion factor and a security factor, wherein a weight associated with the security factor for selecting the AP is greater than a weight associated with the congestion factor; and connecting to a network via the AP based on the selection.

Certain aspects are directed towards a method for wireless communication. The method generally includes: receiving, from a security management component of the apparatus, an indication of an access point (AP); determining whether the AP has a security protocol enabled; selecting the AP to be used for connection to a network if the AP has the security protocol enabled; and connecting to the network via the AP based on the selection.

Certain aspects are directed towards an apparatus for wireless communication. The apparatus generally includes a memory, and one or more processors coupled to the memory, the one or more processors being configured to: select an access point (AP) from a plurality of candidate APs based on multiple factors associated with each of the plurality of candidate APs, the multiple factors including at least a congestion factor and a security factor, wherein a weight associated with the security factor for selecting the AP is greater than a weight associated with the congestion factor; and connect to a network via the AP based on the selection.

Certain aspects are directed towards an apparatus for wireless communication. The apparatus generally includes a memory, and one or more processors coupled to the memory, the one or more processors being configured to: receive, from a security management component of the apparatus, an indication of an access point (AP); determine whether the AP has a security protocol enabled; select the AP to be used for connection to a network if the AP has the security protocol enabled; and connect to the network via the AP based on the selection.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
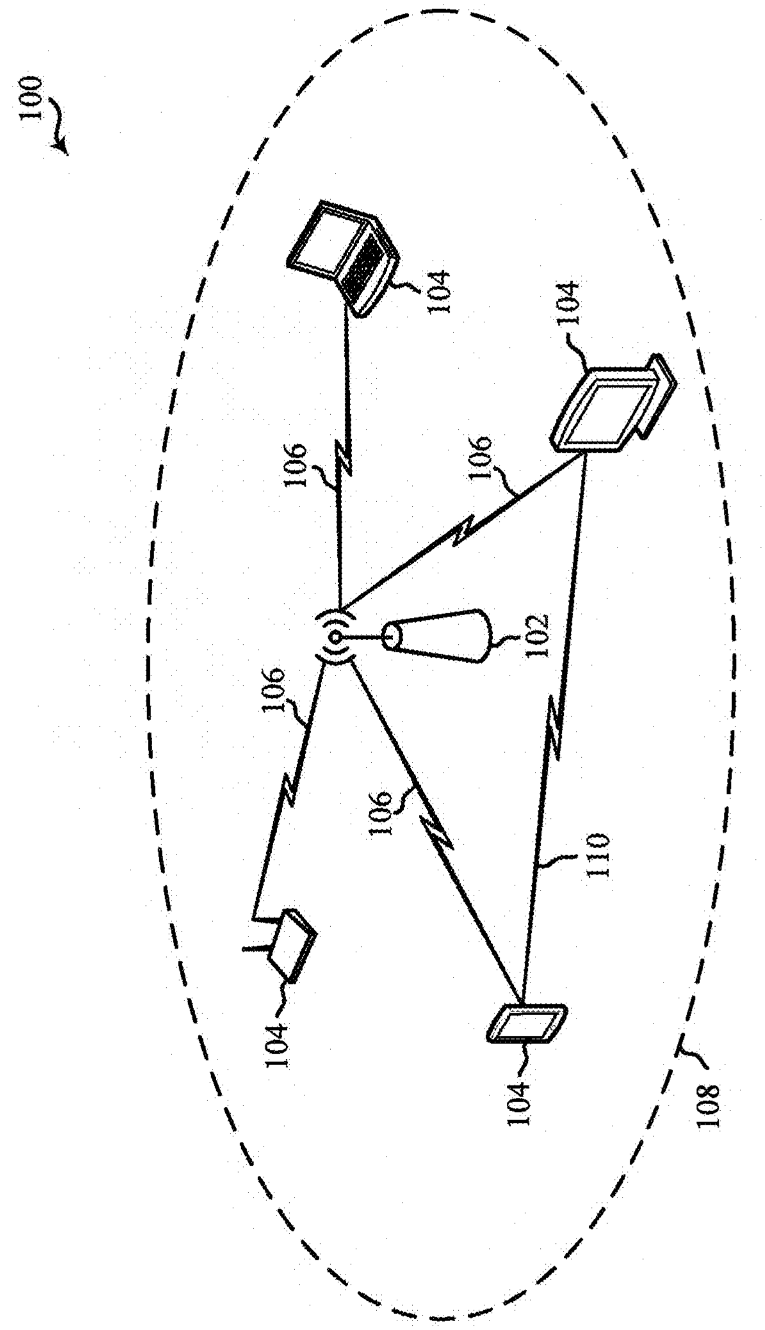
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Various aspects relate generally to systems and techniques for selecting a network device (e.g., an access point (AP) or other network device) for connection to a network in a manner as to avoid a security vulnerability. While an AP is used herein as an example of a network device for illustrative purposes, the aspects described herein may be used to select other types of network devices, such as base stations, servers, or other network devices. In some scenarios, an adversary may implement an AP that mimics configurations of another AP in hopes of connecting with a station (STA), allowing the adversary to inspect, modify, and forge any data exchanged with the STA. To avoid such an attack (e.g., referred to as an evil twin AP attack), some APs may implement a security protocol, such as a simultaneous authentication of equals (SAE) public key (SAE-PK) authentication protocol. However, when selecting between APs, one candidate AP may have SAE-PK enabled and another candidate AP may have SAE-PK disabled. If the AP with SAE-PK disabled is selected for connection, the STA may be vulnerable to the evil twin AP attack. For example, the STA may score different factors associated with each candidate AP and select one of the APs having the highest score. The AP with SAE-PK disabled may have a high score for a congestion factor, and thus, may be selected for connection.

Certain aspects of the present disclosure provide systems and techniques for increasing the likelihood that an AP with SAE-PK enabled is selected. For example, when scoring the different factors, a greater weight may be given to a factor associated with whether the AP has SAE-PK enabled as compared to the congestion factor. In this manner, even though the AP with SAE-PK disabled may have a higher score for the congestion factor, the AP with SAE-PK enabled will be more likely to be selected by the STA.

In some implementations, a security management component (e.g., a supplicant of a hardware abstract layer of the station) may recommend to a driver of the station to select an AP having SAE-PK enabled. In some aspects, the driver may prioritize the recommendation from the security management component and select the AP with SAE-PK enabled as recommended (e.g., without performing the scoring of factors as described). The driver may only perform the scoring as described if a target AP recommended by the security management component has SAE-PK disabled.

Further aspects of the systems and techniques described herein will be described with respect to the figures.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or CCC20 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
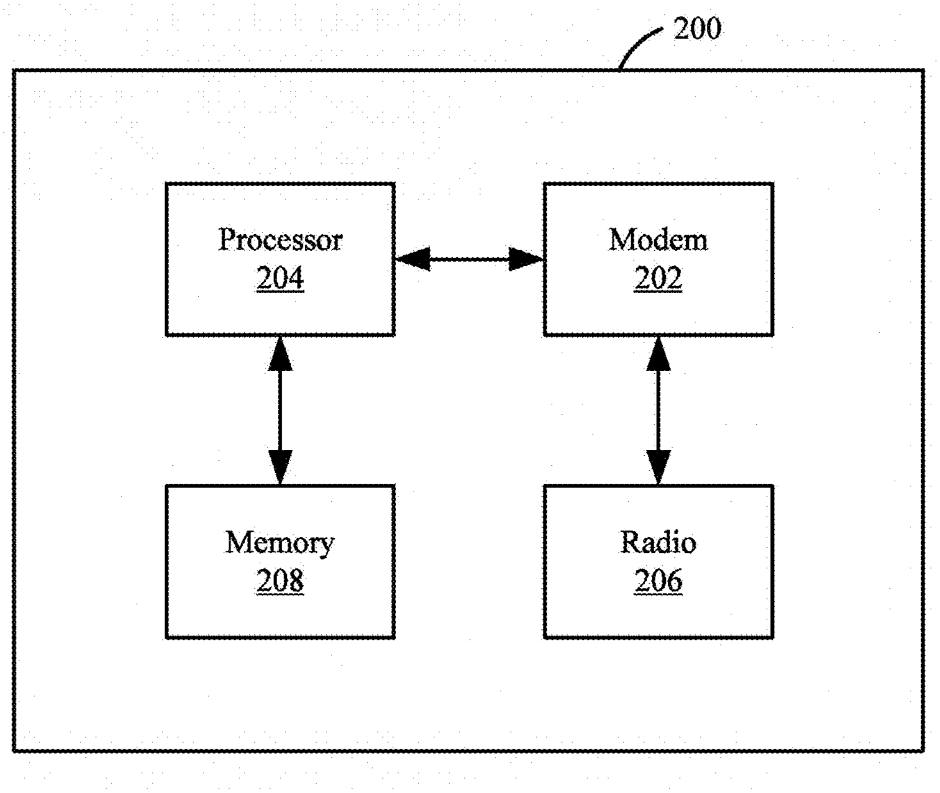
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described above with reference to FIG. 1. In some implementations, the wireless communication device 200 can be an example of a device for use in an AP such as the AP 102 described above with reference to FIG. 1. The wireless communication device 200 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 200 can be, or can include, a chip, system on chip (SoC), chipset, package or device that includes one or more modems 202, for example, a Wi-Fi (IEEE 802.11 compliant) modem. In some implementations, the one or more modems (collectively "the modem 202") additionally include a WWAN modem (for example, a 3GPP 4G LTE or 5G compliant modem). In some implementations, the wireless communication device 200 also includes one or more processors, processing blocks or processing elements (collectively "the processor 204") coupled with the modem 202. In some implementations, the wireless communication device 200 additionally includes one or more radios (collectively "the radio 206") coupled with the modem 202. In some implementations, the wireless communication device 200 further includes one or more memory blocks or elements (collectively "the memory 208") coupled with the processor 204 or the modem 202.

The modem 202 can include an intelligent hardware block or device such as, for example, an application-specific integrated circuit (ASIC), among other examples. The modem 202 is generally configured to implement a PHY layer, and in some implementations, also a portion of a MAC layer (for example, a hardware portion of the MAC layer). For example, the modem 202 is configured to modulate packets and to output the modulated packets to the radio 206 for transmission over the wireless medium. The modem 202 is similarly configured to obtain modulated packets received by the radio 206 and to demodulate the packets to provide demodulated packets. In addition to a modulator and a demodulator, the modem 202 may further include digital signal processing (DSP) circuitry, automatic gain control (AGC) circuitry, a coder, a decoder, a multiplexer and a demultiplexer. For example, while in a transmission mode, data obtained from the processor 204 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 206. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 206, for example, by detecting the presence of the signal and estimating the initial timing and frequency offsets. The DSP circuitry is further configured to digitally condition the signal, for example, using channel (narrow-band) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 204) for processing, evaluation or interpretation.

The radio 206 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 206, which then transmits the symbols via the coupled antennas. Similarly, symbols received via the antennas are obtained by the radio 206, which then provides the symbols to the modem 202.

The processor 204 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 204 processes information received through the radio 206 and the modem 202, and processes information to be output through the modem 202 and the radio 206 for transmission through the wireless medium. For example, the processor 204 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 204 may generally control the modem 202 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 204, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
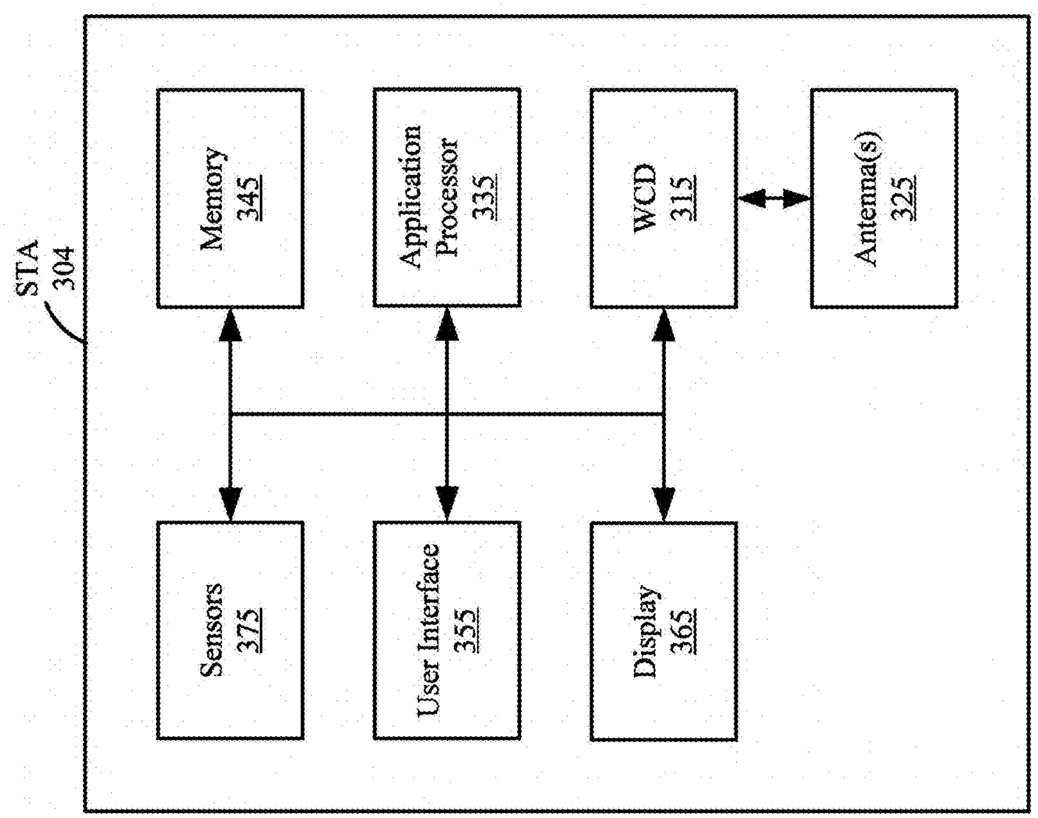
FIG. 3B shows a block diagram of an example station (STA).
Figure 3A:
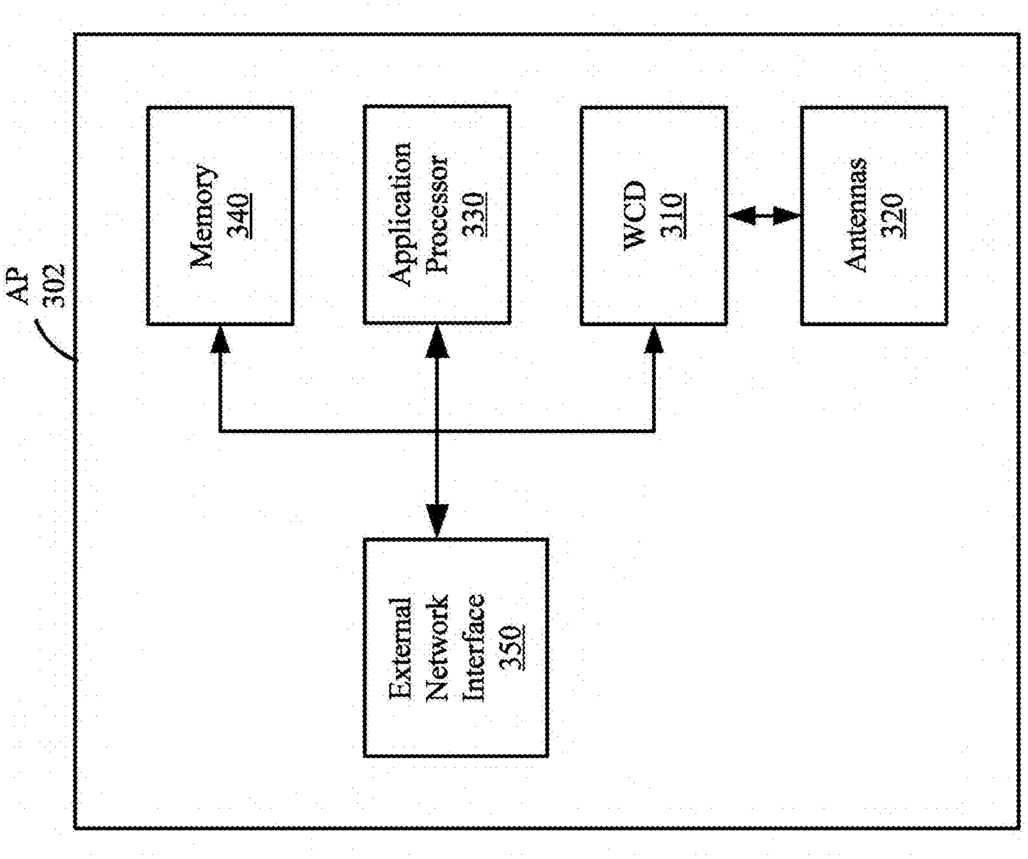
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Some public Wi-Fi networks use a group-level password for link-layer authentication. A password can be distributed to a group of users. The password may provide a simple means of network access control. The size of the user group to which the password is distributed might be large. Therefore, in many such deployments, it is not difficult for a potential adversary to gain knowledge of the password to implement an "evil twin AP" attack. For example, an adversary with knowledge of the password can launch an attack on client STAs by impersonating an AP. Once a client STA connects to the adversary's AP, the adversary is able to inspect, modify, and forge any data exchanged with the client STA.

Simultaneous authentication of equals (SAE) Public Key (SAE-PK) authentication is an extension of SAE that is intended for use cases where authentication is based on a password that might be distributed to or obtained by a potential adversary. With SAE-PK, the AP in an infrastructure network is additionally authenticated based on a static public/private key pair to provide protection against impersonation attacks as described above. However, not all APs support (or have enabled) the SAE-PK security protocol. While aspects are described herein with respect to the SAE-PK security protocol, the systems and techniques described herein can also be applied to other security protocols.

Figure 4:
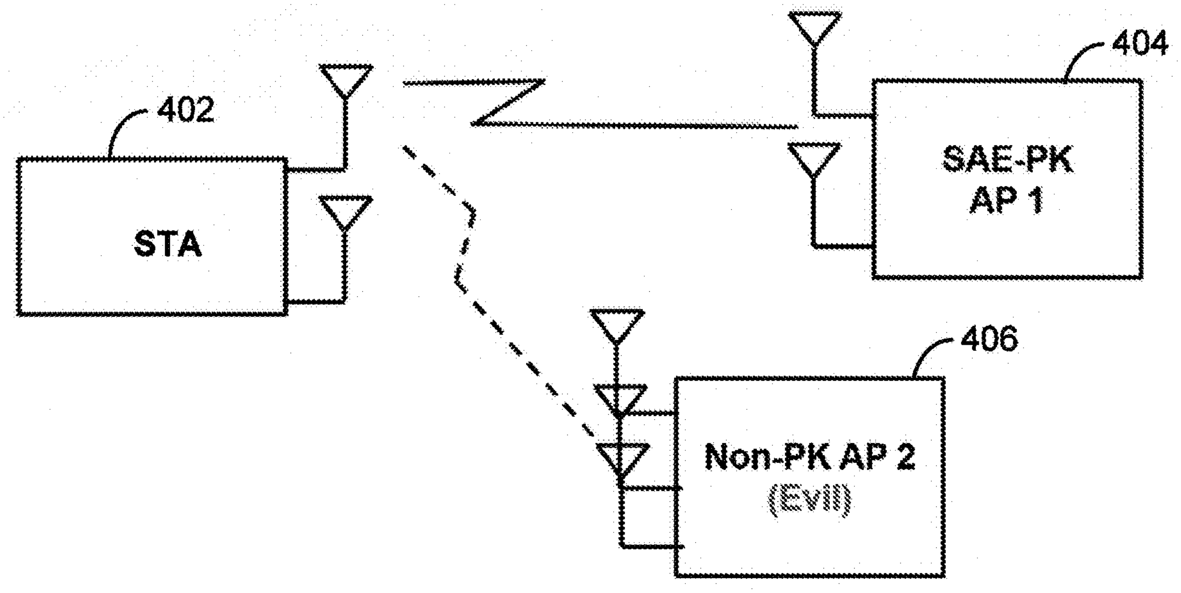
FIG. 4 illustrates a STA selecting between APs, in accordance with certain aspects of the present disclosure.

FIG. 4 illustrates a STA 402 selecting between APs 404, 406, in accordance with certain aspects of the present disclosure. The STA 402 may correspond to the STA 104 described with respect to FIG. 1 or STA 304 described with respect to FIG. 3B. As shown, AP 404 may support and have enabled SAE-PK security protocol, while AP 406 may have SAE-PK disabled. The AP 406 may be an evil twin AP. In other words, AP 406 may be set up by an adversary to mimic AP 404 in an attempt to have STA 402 connect to the AP 406 to inspect, modify or forge data exchanged with the STA. For example, AP 404 and AP 406 may be configured with the same identifier (e.g., service set identifier (SSID)). If the STA 402 selects AP 406 for connection, then the STA 402 may become the victim of an evil town AP attack.

Certain aspects are directed to techniques for increasing the likelihood that an AP having SAE-PK security protocol enabled is selected. For example, when a STA has SAE-PK enabled for a network and is selecting between discovered APs in that network (e.g., in a service set associated with a SSID) that it considers suitable candidates for association, the STA may attempt to authenticate with APs that are advertising support for SAE-PK before attempting to authenticate with any APs that are not advertising support for SAE-PK.

Figure 5:
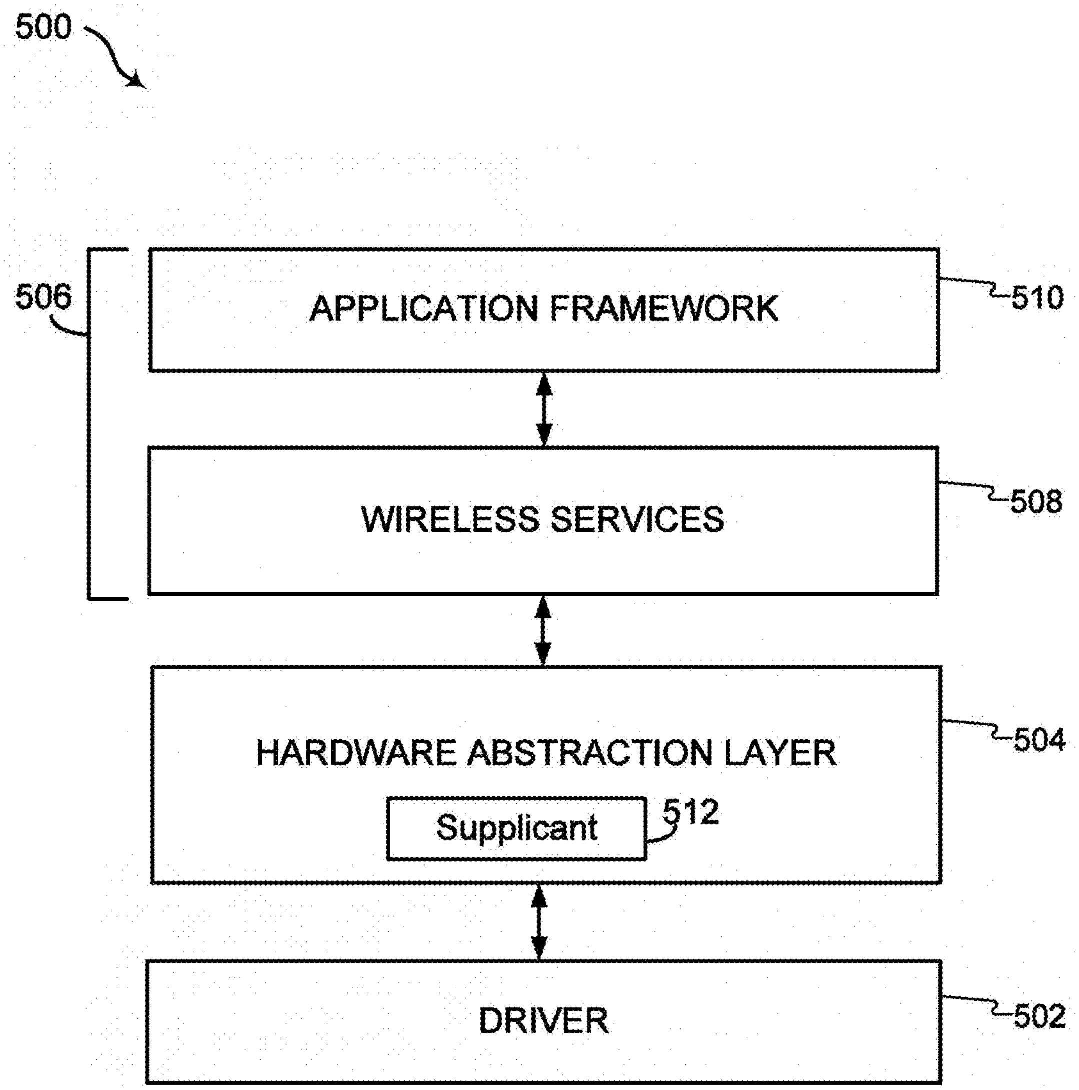
FIG. 5 illustrates a framework of a STA for wireless communication, in accordance with certain aspects of the present disclosure.

FIG. 5 illustrates a framework 500 (e.g., protocol stack) of a station (e.g., STA 402) for wireless communication. As shown, framework 500 includes a driver 502, a hardware abstraction layer 504, and an upper layer 506 (e.g., including an application framework 510 and wireless services 508, such as Wi-Fi services or other wireless services). The framework 500 includes support for various Wi-Fi protocols and modes, including Wi-Fi infrastructure (STA), Wi-Fi hotspot, Wi-Fi direct (e.g., peer-to-peer), Wi-Fi aware, and Wi-Fi round trip time (RTT), as implemented by wireless services 508 (e.g., Wi-Fi services). An application (e.g., included in the application framework of the upper layer 506) may use and communicate with the various wireless services 508 (e.g., Wi-Fi services). The wireless services 508 (e.g., Wi-Fi services) may communicate with the hardware abstraction layer 504 over a hardware abstraction layer interface description language (HIDL) interface. The hardware abstraction layer 504 may implement a security management component, which may be referred to as a supplicant 512 in some implementations. The supplicant 512 may be a component for controlling the WiFi driver 502 (e.g., control scanning for APs and connecting to APs). The supplicant 512 may be a WiFi protected access (WPA) supplicant for managing WPA. For example, the WPA supplicant may determine whether an AP supports a specific security protocol (e.g., SAE-PK) and indicate to the driver to connect to the AP accordingly, as described in more detail herein.

Figure 6:
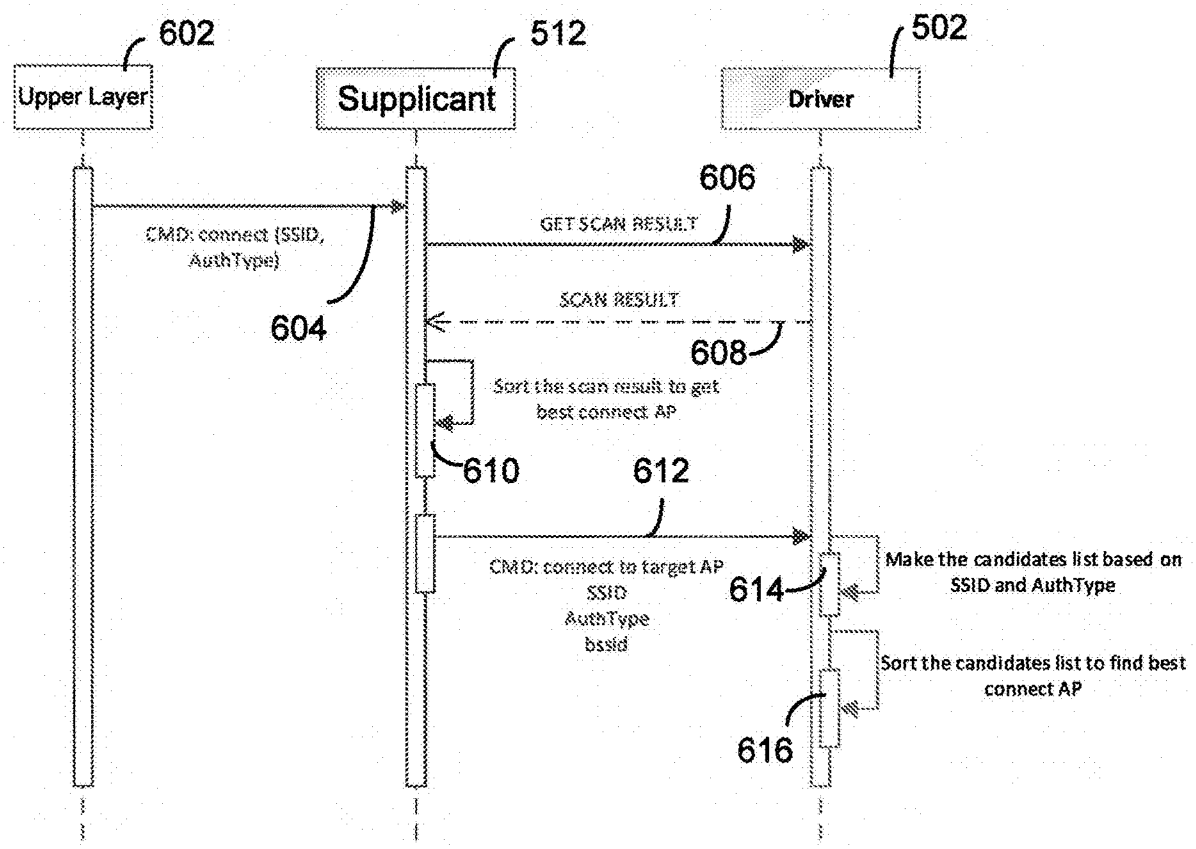
FIG. 6 is a call flow diagram illustrating example operations by a station for AP selection, in accordance with certain aspects of the present disclosure.

FIG. 6 is a call flow diagram illustrating example operations by a station for AP selection in accordance with certain aspects of the present disclosure. As shown, the upper layer may send a command (CMD) 604 to connect with an AP, including a service set identifier (SSID) and authentication type (AuthType). The authentication type indicates the authentication method to use for association with an AP. The upper layer 602 may be a WiFi alliance (WFA) test tool (e.g., sigma_dut, used for WFA certification testing) or application framework on wireless stations. In response to the command, a security management component (e.g., supplicant 512) of the STA 402 may send a request 606 to obtain scan results. For example, the driver 502 may scan for APs available for connection in response to request 606 and provide the scan results 608 (e.g., the available APs) to the supplicant 512. At block 610, the supplicant 512 may sort the scan results (e.g., the available APs) to determine one of the APs for connection. For example, supplicant 512 may select one of the APs with SAE_PK enabled. The AP selection process of the supplicant 512 is described in more detail herein with respect to FIG. 10.

The supplicant 512 may then send, to driver 502, a command 612 to connect to a target AP (e.g., the AP selected at block 610). Command 612 may include an SSID associated with a WLAN and a BSSID associated with the selected AP of the WLAN. The SSID identifies the WLAN and the BSSID may be the MAC address of the AP that is part of the WLAN. At block 614, driver 502 may make a candidate list of APs based on SSID and authentication type, and at block 616, sort the candidate list to select one of the AP. For instance, driver 502 may score various factors to select an AP. Based on the scoring of the different factors, the driver may select an AP (e.g., AP 404) with SAE-PK enabled (e.g., as suggested by the supplicant 512), or select another AP (e.g., AP 406) with SAE-PK disabled, making the STA vulnerable to an evil-twin attack as described herein. The factors may include at least one factor associated with congestion and one factor associated with whether SAE-PK is enabled. The driver may connect to a SAE-PK disabled AP with superior score factors (e.g., compared to score factors of another AP that may have SAE-PK enabled). Thus, the driver's score results conflict with supplicant's selection of an AP with SAE-PK enabled. This may be due to the driver giving a greater score weight to a congestion factor, but too low a score to the SAE-PK factor. Some aspects of the present disclosure are directed to a scoring technique that increases the likelihood that an AP with SAE-PK enabled is selected, reducing the likelihood of selecting an evil twin AP. The scoring technique used for AP selection is described in more detail with respect to FIG. 7.

Figure 7:
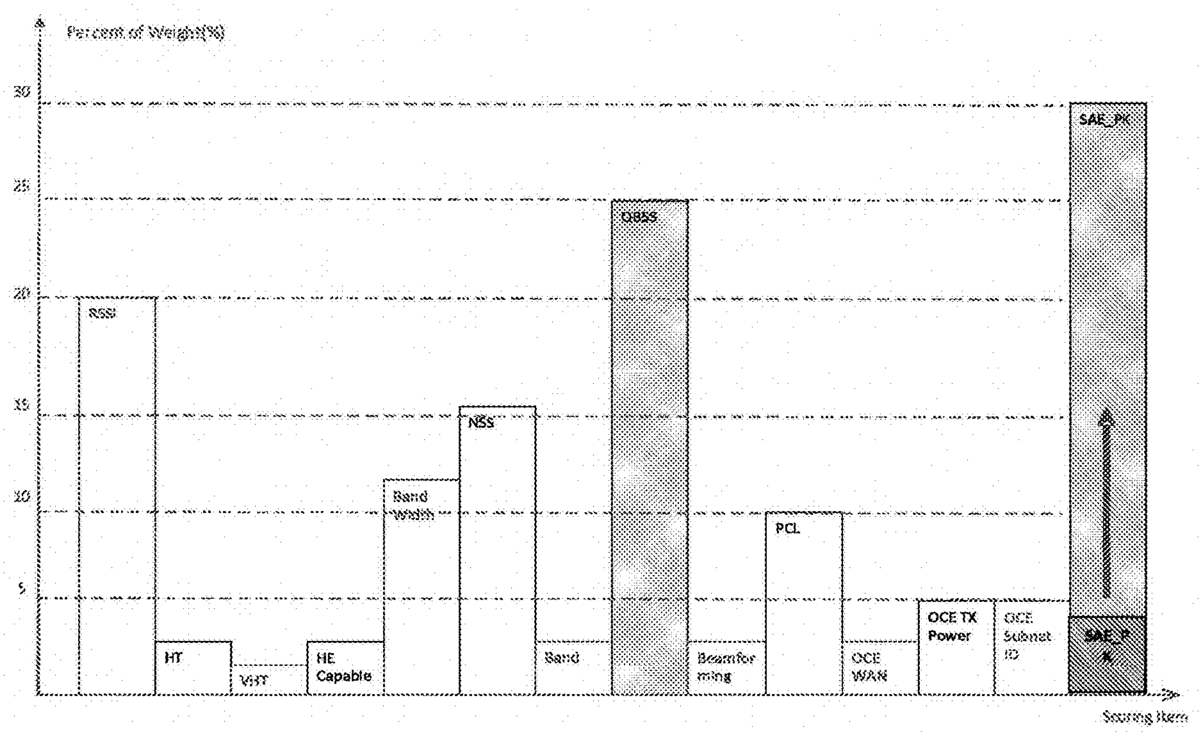
FIG. 7 is a graph illustrating weights associated with various factors for scoring APs, in accordance with certain aspects of the present disclosure.

FIG. 7 is a graph 700 illustrating weights associated with various factors for scoring APs, in accordance with certain aspects of the present disclosure. As shown, the various factors may include a received signal strength indicator (RSSI) associated with the AP, whether the AP supports high throughput (HT) protocol (e.g., associated with IEEE 802.11n), whether the AP supports very high throughput (VHT) protocol (e.g., associated with IEEE 802.11ac), whether the AP is high efficiency (HE) capable (e.g., associated with IEEE 802.11ax), the bandwidth associated with the AP, a number of spatial streams (NSS) used by the AP, the band (e.g., 2G, 5G, or 6G) associated with the AP, quality of service (QoS) enhanced basic service set (QBSS) (also referred to herein as a congestion factor), whether the AP supports beamforming, a preferred channel list (PCL) associated with the AP, an optimized connectivity experience (OCE) wide area network (WAN) associated with the AP, OCE transmit (TX) power, OCE subnet identifier, or whether SAE-PK is enabled (also referred to herein as a security factor). Other factors, such as whether extremely high throughput (EHT) is supported by the AP, may also be considered. For QBSS, an information element (IE) (referred to as a QBSS IE) may be transmitted by each AP indicating channel load information of the AP, allowing the STA to assess congestion. As shown, each factor may be associated with a weight as a percentage. For example, the maximum score available for each factor may be set based on the associated weight as a percentage of a reference score of 10000. For QBSS as one example, the weight may be set to 25%, and thus, the maximum score that may be given for the QBSS factor may be 2500. For RSSI, the weight may be set to 20%, and thus, the maximum score that may be give for the RSSI factor may be 2000.

Typically, the weight associated with SAE-PK may be less than the weight associated with congestion (e.g., QBSS). For example, the weight associated with SAE-PK may be 3%, while the weight associated with congestion may be 25%, as shown. As a result, an AP having SAE-PK disabled may be selected for association due to receiving a high score for the congestion factor. In some aspects of the present disclosure, to increase the likelihood that an AP with SAE-PK enabled is selected for connection, the weight associated with SAE-PK may be set to be higher than the weight associated with the congestion factor. For instance, the weight associated with SAE-PK may be set to 30%, as shown. The higher score weight for the SAE-PK factor may suppress the influence of congestion that may have otherwise caused the STA to select an AP with SAE-PK disabled.

As an example, a first AP may have SAE-PK enabled and a second AP may have SAE-PK disabled. The first AP may receive a score of 2000 for RSSI, a score of 0 for PCL, a score of 0 for HT, a score of 0 for VHT, a score of 0 for HE, a score of 0 for beamforming, a score of 0 for band, a score of 144 for bandwidth, a score of 0 for band, a score of 1250 for congestion, a score of 400 for NSS, a score of 100 for OCE WAN, a score of 244 for OCE AP TX power, a score of 0 for OCE subnet ID, a score of 3000 for SAE-PK, and a score of 0 for EHT, providing a total score of 7138 for the first AP. A second AP may receive a score of 2000 for RSSI, a score of 0 for PCL, a score of 0 for HT, a score of 0 for VHT, a score of 0 for HE, a score of 0 for beamforming, a score of 0 for band, a score of 144 for bandwidth, a score of 0 for band, a score of 2500 for congestion, a score of 400 for NSS, a score of 100 for OCE WAN, a score of 244 for OCE AP TX power, a score of 0 for OCE subnet ID, a score of 0 for SAE-PK, and a score of 0 for EHT, providing a total score of 5388. Thus, by providing a score of 3000 for the SAE-PK factor, the first AP having SAE-PK enabled may be selected for connection. On the other hand, if SAE-PK only had a weight of 3% (e.g., a maximum score of 300), the first AP would only have a score of 4438 and the second AP having SAE-PK disabled would be selected (e.g., since the second AP would have a higher score than the first AP).

Figure 8:
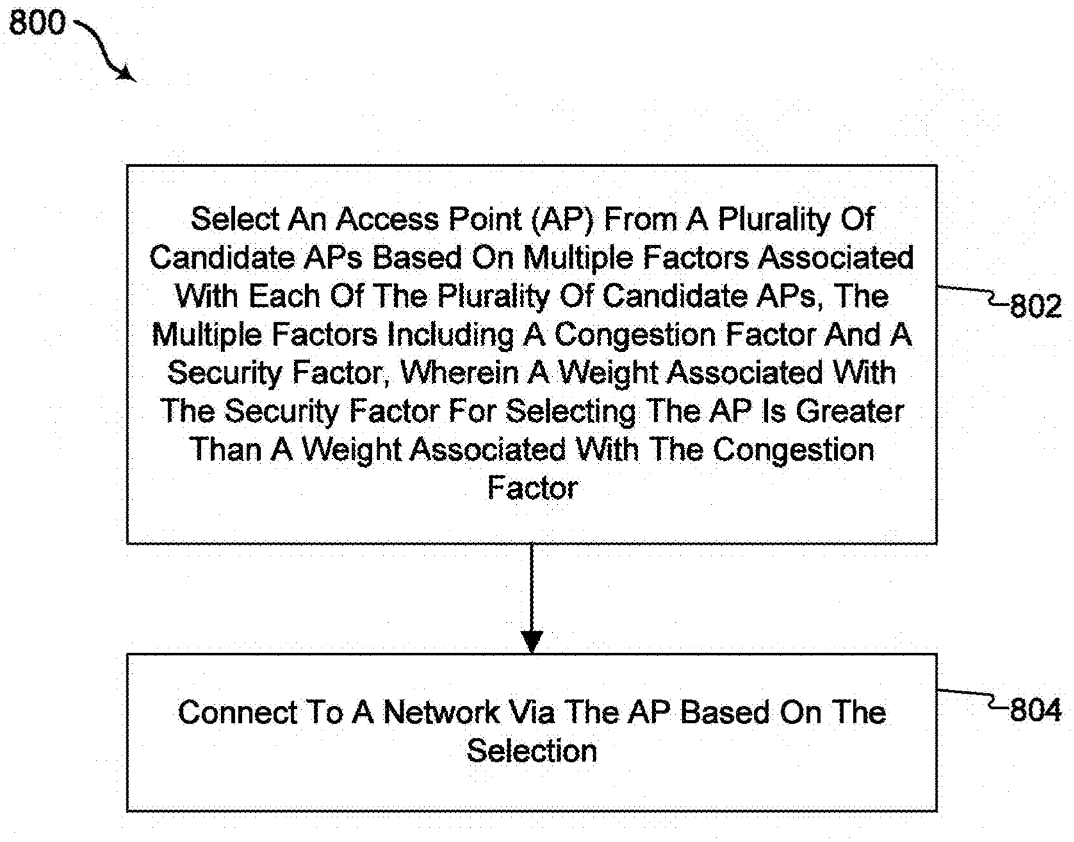
FIG. 8 is a flow diagram illustrating an example of a process for wireless communication, in accordance with certain aspects of the present disclosure.

FIG. 8 is a flow diagram illustrating an example of a process 800 for wireless communication. The process 800 may be performed by a connection management system, such as the processor 204 or processor 1210, and memory 208 or storage device 1230.

At block 802, the connection management system selects an access point (AP) from a plurality of candidate APs based on multiple factors (e.g., factors described with respect to FIG. 7) associated with each of the plurality of candidate APs. The multiple factors may include a congestion factor and a security factor (e.g., SAE-PK factor). The security factor may be a factor associated with whether a SAE-PK protocol is enabled.

In some aspects of the present disclosure, a weight associated with the security factor for selecting the AP may be greater than a weight associated with the congestion factor. For example, as described with respect to FIG. 7, the weight associated with the congestion factor may be 25%, while the weight associated with the security factor may be 30%. In some aspects, selecting the AP may include performing, for each of the plurality of candidate APs, a weighted sum of scores associated with each of the multiple factors to generate a total score for each of the plurality of candidate APs, and select the AP from the plurality of candidate APs based on the total score for the AP being a highest among the plurality of candidate APs.

To select the AP, the connection management system may assign a score to the congestion factor (e.g., a score of 2,500), where a maximum of the score to be assigned to the congestion factor is equal to a reference score (e.g., 10,000) multiplied by the weight (e.g., 25%) associated with the congestion factor, and assign a score to the security factor, where a maximum of the score to be assigned to the security factor is equal to the reference score multiplied by the weight associated with the security factor. The connection management system may then select the AP based on a total score including a sum of the score assigned to the congestion factor and the score assigned to the security factor. In some aspects, the connection management system may scan a medium to find the plurality of candidate APs.

The connection management system may receive, at a driver and from a security management component of the apparatus, an indication that the AP supports the SAE-PK protocol, and select the AP based on the indication. The security management component may be a supplicant (e.g., supplicant 512) in a hardware abstraction layer of the apparatus. At block 804, the connection management system connects to a network via the AP based on the selection.

In some aspects of the present disclosure, the priority of an identifier (ID) associated with the AP (e.g., BSSID) recommend by supplicant may be upgraded so that the driver selects the AP having SAE-PK enabled (e.g., as recommended by the supplicant). The supplicant correctly selects an AP with SAE-PK enabled, however, the driver overturns supplicant's selection due to the scoring mechanism described herein. It may not be possible to simply disable the WLAN driver policy to let the supplicant make the decision of which AP to select. Setting the weight associated with SAE-PK to 30% (or to be the highest weight among the various factors) allows the SAE-PK factor to suppress the influence of any other single factor (e.g., including the second-highest score weight associated with the congestion factor) such that the driver chooses the AP with SAE-PK enabled. However, the driver may still be susceptible to an attack when an evil AP with SAE-PK disabled has multiple superior score factors (e.g., score weight of QBSS+RSSI+PCL=2500+2000+1000=5500 would be larger than that of SAE-PK standalone=3000). Thus, the STA may be a victim of an attack under a particular scenario that the AP with SAE-PK disabled has an overwhelming physical advantage with respect to the factors described. Thus, in some aspects of the present disclosure, priority may be given to the AP (e.g., BSSID) recommended by the supplicant.

Figure 9:
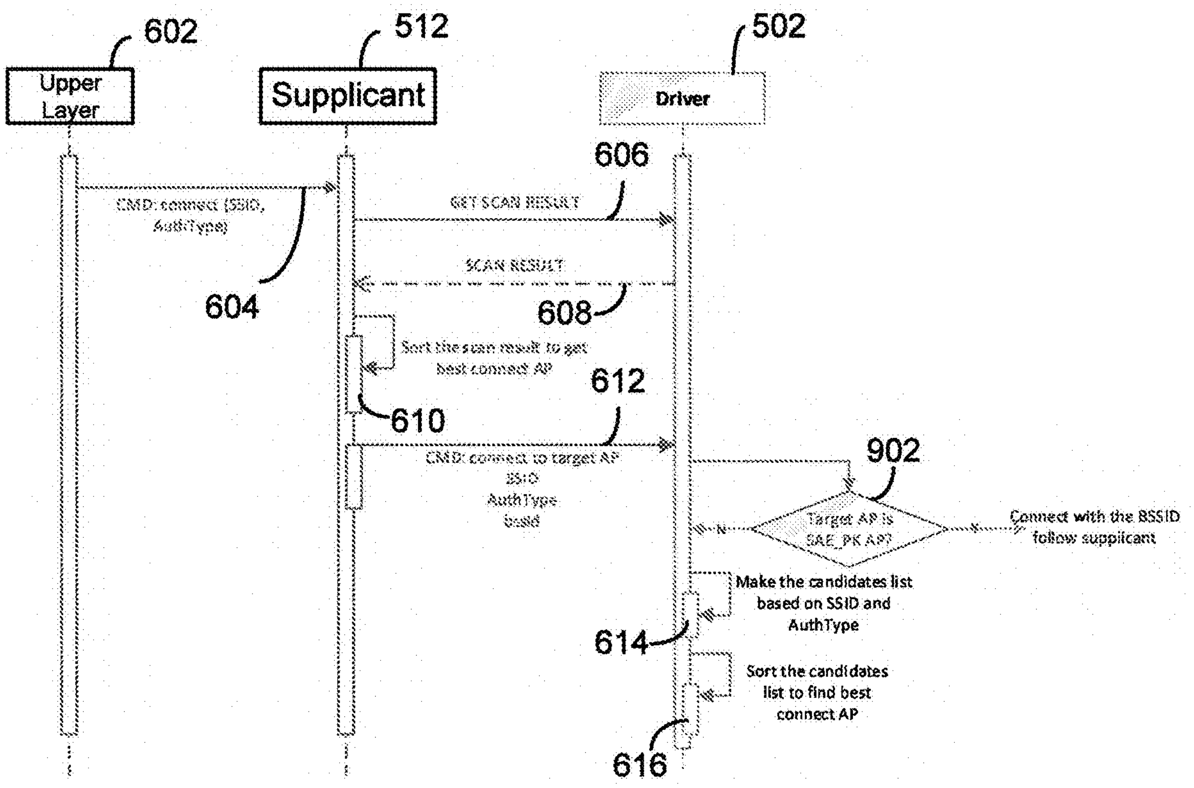
FIG. 9 is a call flow diagram illustrating example operations for AP selection with priority for an AP having a security protocol enabled, in accordance with certain aspects of the present disclosure.

FIG. 9 is a call flow diagram illustrating example operations for AP selection with priority for an AP having SAE-PK enabled, in accordance with certain aspects of the present disclosure. As illustrated, once the supplicant 512 provides the command 612 indicating a target AP, the driver 502 may determine, at block 902, whether the target AP has SAE-PK enabled. If so, the driver connects to the target AP having SAE-PK enabled (e.g., using the BSSID as indicated by the supplicant via command 612). If not, then the driver performs the scoring technique described herein (e.g., at blocks 614, 616) to select one of candidate APs for connection. Thus, the driver may be configured to select an AP with SAE-PK enabled without modifying the scoring policy of the driver and may result in the driver selecting an AP with SAE-PK enabled regardless of scoring factors considered.

Figure 10:
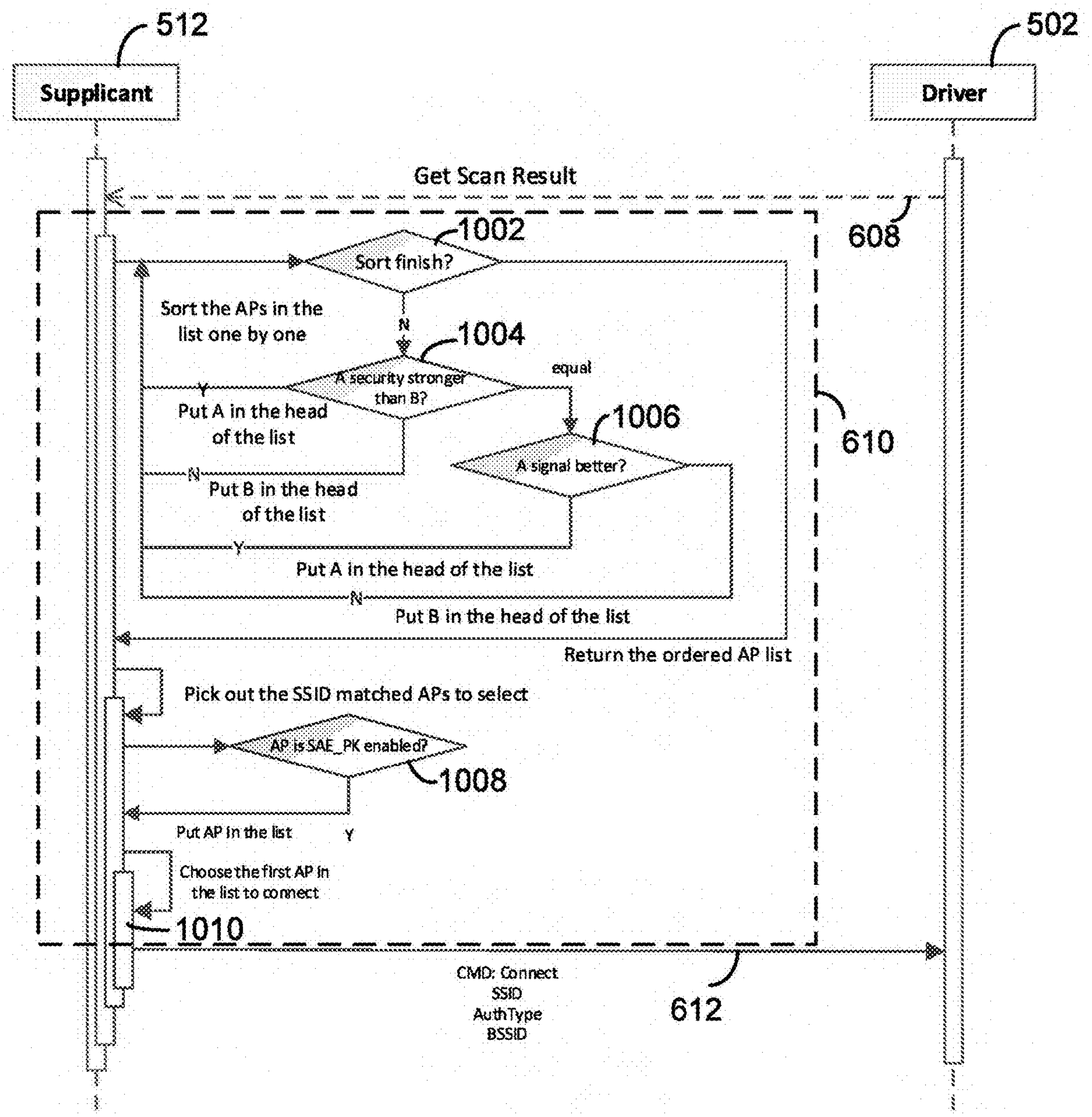
FIG. 10 illustrates example operations for selection of a target AP having a security protocol enabled, in accordance with certain aspects of the present disclosure.

FIG. 10 illustrates example operations performed by a supplicant for selection of a target AP having SAE-PK enabled. As shown, once the supplicant 512 receives the scan results 608 indicating candidate APs, the supplicant sorts the APs by security strength and signal strength. For example, at block 1004, the supplicant 512 determines whether one AP (e.g., AP A) has security that is stronger than another AP (e.g., AP B). If so, AP A is placed on top of the list of the APs. If the security is equal, then at block 1006, the supplicant determines which AP has a stronger signal strength and places the AP with the stronger signal strength at the top of the list. Once the sorting is finished (e.g., as determined at block 1002), the supplicant 512 returns a sorted list. In this manner, the supplicant generates a list of APs sorted by security strength and signal strength. The supplicant then picks out the APs from the sorted list having an SSID associated with the WLAN for connection, and for each AP, determines at block 1008 whether the AP has SAE-PK enabled, and if so, places the AP in the list (e.g., at the top of the list). Thus, the supplicant generates a list having APs with SAE-PK enabled at the top of the list and sorted by security strength and signal strength. At block 1010, the supplicant selects one AP from the top of the list and indicates the AP as a target AP for connection to the driver via command 612, as described herein.

Figure 11:
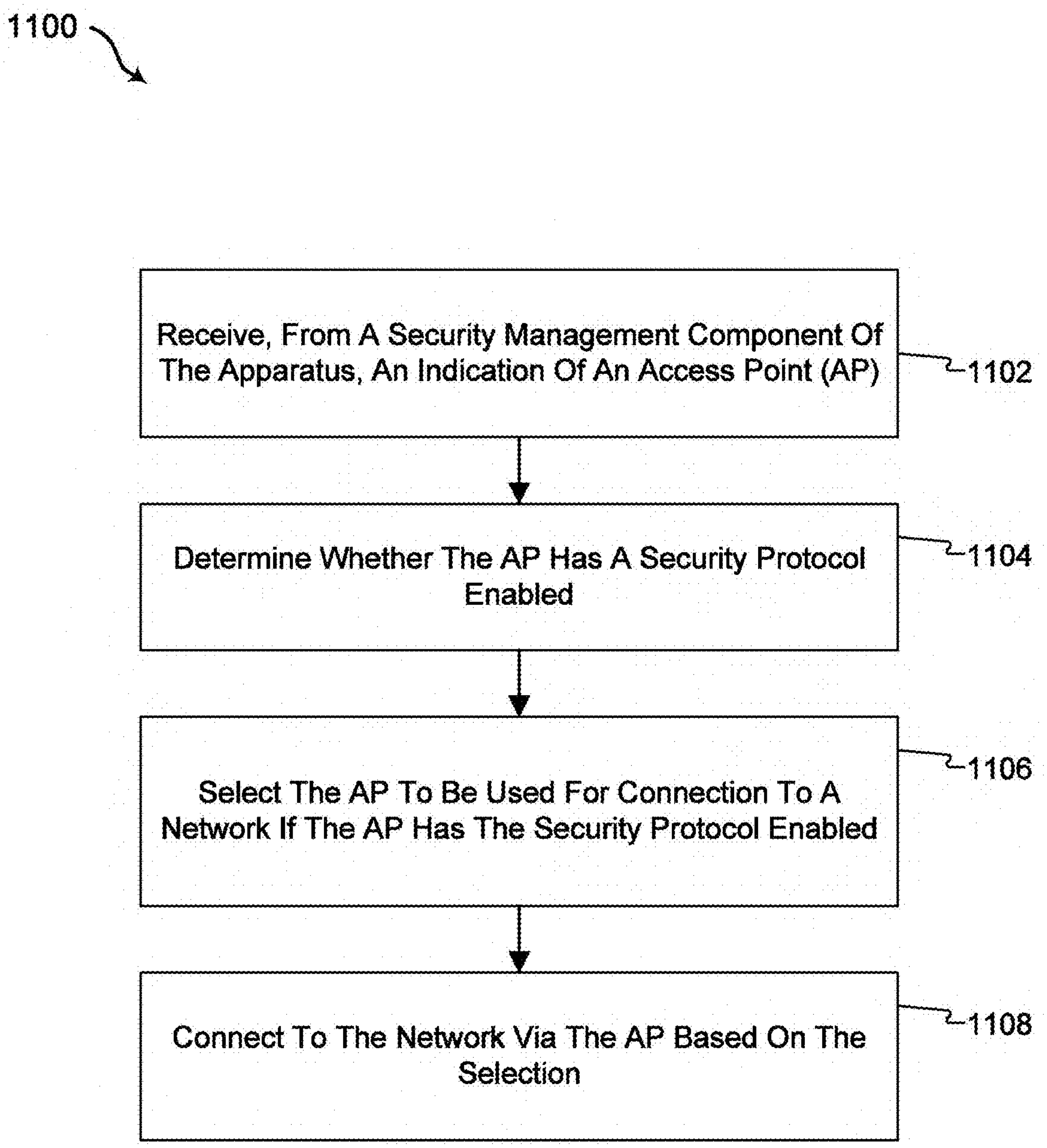
FIG. 11 is a flow diagram illustrating an example of a process for wireless communication, in accordance with certain aspects of the present disclosure.

FIG. 11 is a flow diagram illustrating an example of a process 1100 for wireless communication. The process 800 may be performed by a connection management system, such as the processor 204 or processor 1210, and memory 208 or storage device 1230.

At block 1102, the connection management system receives, from a security management component (e.g., supplicant 512) of the apparatus, an indication of an AP (e.g., the target AP described with respect to FIG. 9). At block 1104, the connection management system determines whether the AP has a security protocol (e.g., SAE-PK) enabled, and at block 1106, selects the AP to be used for connection to a network if the AP has the security protocol enabled.

At block 1108, the connection management system connects to the network via the AP based on the selection. In some aspects, the AP is one of a plurality of candidate APs. If the AP indicated by the security management component does not have SAE-PK enabled, the connection management system selects one of the plurality of candidate APs for the connection to the network based on factors associated with each of the plurality of candidate APs.

Figure 12:
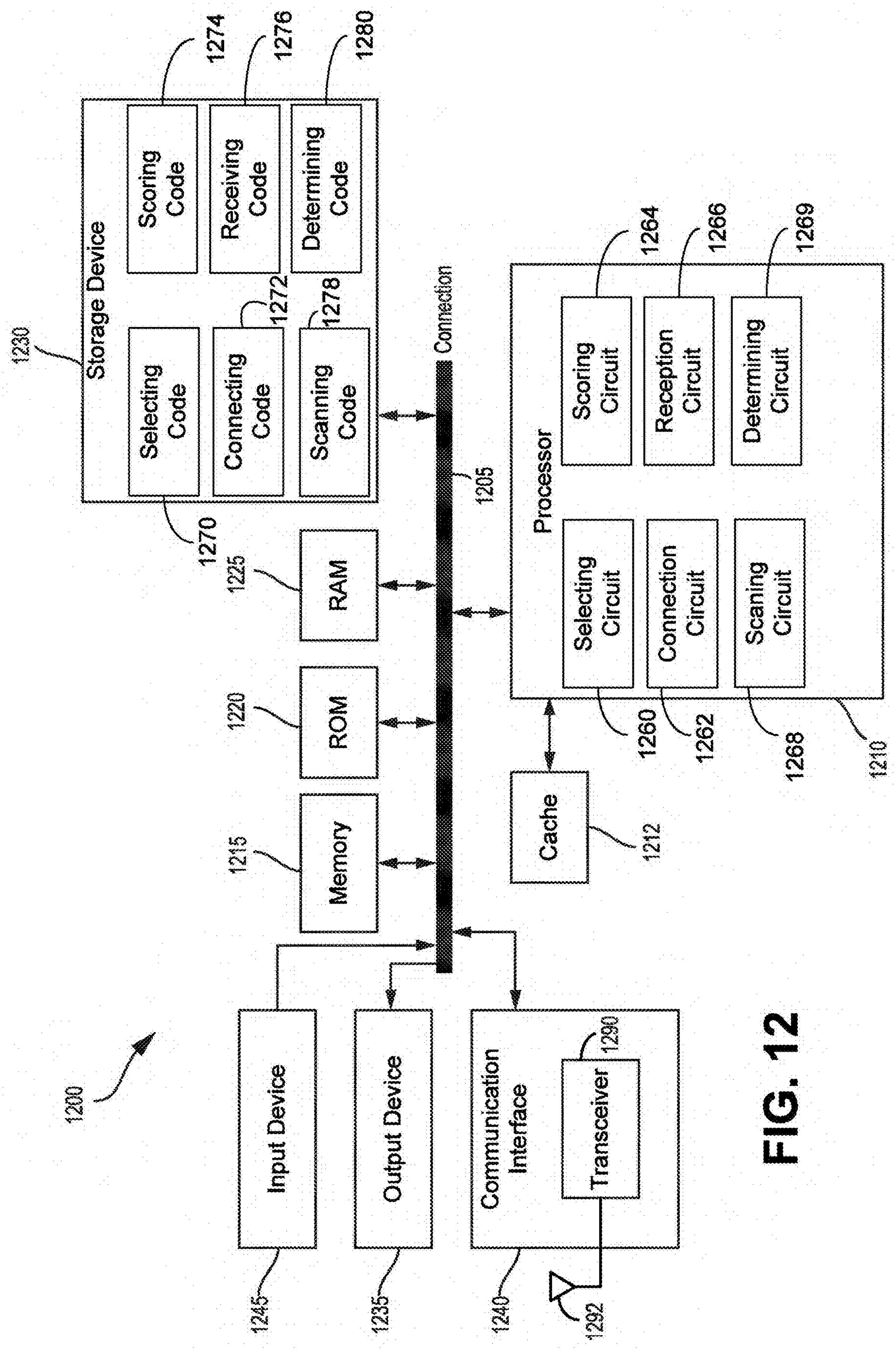
FIG. 12 is a diagram illustrating an example of a system for implementing certain aspects of the present technology.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service. In some aspects, code stored in storage device 1230 may be configured to control processor 1210 to perform operations described herein. In some aspects, the processor 1210 may be a special-purpose processor where instructions or circuitry are incorporated into the actual processor design to perform the operations described herein. Processor 1210 may essentially be a completely self-contained computing system, containing multiple cores or processors, a bus, memory controller, cache, etc. A multi-core processor may be symmetric or asymmetric. For example, the processor 1210 may include circuit 1260 for selecting, circuit 1262 for connecting, circuit 1264 for scoring, circuit 1266 for receiving, circuit 1268 for scanning, and circuit 1269 for determining.

The storage device 1230 may store code which, when executed by the processors 1210, performs the operations described herein. For example, the storage device 1230 may include code 1270 for selecting, code 1272 for connecting, code 1274 for scoring, code 1276 for receiving, code 1278 for scanning, and code 1280 for determining.

To enable user interaction, computing system 1200 includes an input device 1245, which can represent any number of input mechanisms, such as a microphone for speech, a camera for generating images or video, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDouNavigation Satellite System (BDS), and the Europe-based Galileo GNSS. There is no restriction on operating on any particular hardware arrangement, and therefore the basic features here may easily be substituted for improved hardware or firmware arrangements as they are developed. The communications interface 1240 may include a transceiver 1290 for transmitting and receiving signals via one or more antennas 1292.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

EXAMPLE ASPECTS

Illustrative aspects of the disclosure include:

Aspect 1: An apparatus for wireless communication, comprising: a memory; and one or more processors coupled to the memory, the one or more processors being configured to: select an access point (AP) from a plurality of candidate APs based on multiple factors associated with each of the plurality of candidate APs, the multiple factors including at least a congestion factor and a security factor, wherein a weight associated with the security factor for selecting the AP is greater than a weight associated with the congestion factor; and connect to a network via the AP based on the selection.

Aspect 2: The apparatus of Aspect 1, wherein, to select the AP, the one or more processors are configured to: perform, for each of the plurality of candidate APs, a weighted sum of scores associated with each of the multiple factors to generate a total score for each of the plurality of candidate APs; and select the AP from the plurality of candidate APs based on the total score for the AP being a highest among the plurality of candidate APs.

Aspect 3: The apparatus of any of Aspects 1 to 2, wherein, to select the AP, the one or more processors are configured to: assign a score to the congestion factor, wherein a maximum of the score to be assigned to the congestion factor is equal to a reference score multiplied by the weight associated with the congestion factor; assign a score to the security factor, wherein a maximum of the score to be assigned to the security factor is equal to a reference score multiplied by the weight associated with the security factor; and select the AP based on a total score including a sum of the score assigned to the congestion factor and the score assigned to the security factor.

Aspect 4: The apparatus of any of Aspects 1 to 3, wherein the security factor comprises a factor associated with whether a simultaneous authentication of equals (SAE) public key (SAE-PK) protocol is enabled.

Aspect 5: The apparatus of any of Aspect 4, wherein the one or more processors are further configured to receive, from a security management component of the apparatus, an indication that the AP supports the SAE-PK protocol, wherein the one or more processors are configured to select the AP based on the indication.

Aspect 6: The apparatus of any of Aspect 5, wherein the security management component comprises a supplicant in a hardware abstraction layer of the apparatus.

Aspect 7: The apparatus of any of Aspects 1 to 6, wherein the one or more processors are configured to scan a medium to find the plurality of candidate APs.

Aspect 8: An apparatus for wireless communication, comprising: a memory; and one or more processors coupled to the memory, the one or more processors being configured to: receive, from a security management component of the apparatus, an indication of an access point (AP); determine whether the AP has a security protocol enabled; select the AP to be used for connection to a network if the AP has the security protocol enabled; and connect to the network via the AP based on the selection.

Aspect 9: The apparatus of Aspect 8, wherein the security protocol comprises a simultaneous authentication of equals (SAE) Public Key (SAE-PK) protocol.

Aspect 10: The apparatus of any of Aspects 8 to 9, wherein: the AP is one of a plurality of candidate APs; and based on a determination that the AP indicated by the security management component does not have SAE-PK enabled, the one or more processors are further configured to select one of the plurality of candidate APs for the connection to the network based on factors associated with each of the plurality of candidate APs.

Aspect 11: The apparatus of any of Aspects 8 to 10, wherein the security management component comprises a supplication of a hardware abstraction layer of the apparatus.

Aspect 12: The apparatus of any of Aspects 8 to 11, wherein the one or more processors are configured to select the AP via a driver of the apparatus.

Aspect 13: The apparatus of any of Aspects 8 to 12, wherein the one or more processors are configured to: receive from the security management component, a request to perform an AP scan; scan a medium to find a plurality of candidate APs in response to the request; and provide an indication of the plurality of candidate APs to the security management component, wherein the AP is one of the plurality of candidate APs.

Aspect 14: A method for wireless communication, comprising: selecting an access point (AP) from a plurality of candidate APs based on multiple factors associated with each of the plurality of candidate APs, the multiple factors including at least a congestion factor and a security factor, wherein a weight associated with the security factor for selecting the AP is greater than a weight associated with the congestion factor; and connecting to a network via the AP based on the selection.

Aspect 15: The method of Aspect 14, wherein selecting the AP comprises: performing, for each of the plurality of candidate APs, a weighted sum of scores associated with each of the multiple factors to generate a total score for each of the plurality of candidate APs; and selecting the AP from the plurality of candidate APs based on the total score for the AP being a highest among the plurality of candidate APs.

Aspect 16: The method of any of Aspects 14 to 15, wherein selecting the AP comprises: assigning a score to the congestion factor, wherein a maximum of the score to be assigned to the congestion factor is equal to a reference score multiplied by the weight associated with the congestion factor; assigning a score to the security factor, wherein a maximum of the score to be assigned to the security factor is equal to a reference score multiplied by the weight associated with the security factor; and selecting the AP based on a total score including a sum of the score assigned to the congestion factor and the score assigned to the security factor.

Aspect 17: The method of any of Aspects 14 to 16, wherein the security factor comprises a factor associated with whether a simultaneous authentication of equals (SAE) public key (SAE-PK) protocol is enabled.

Aspect 18: The method of any of Aspect 17, further comprising receiving, from a security management component of the apparatus, an indication that the AP supports the SAE-PK protocol, wherein the AP is selected based on the indication.

Aspect 19: The method of any of Aspect 18, wherein the security management component comprises a supplicant in a hardware abstraction layer of the apparatus.

Aspect 20: The method of any of Aspects 14 to 19, further comprising scanning a medium to find the plurality of candidate APs.

Aspect 21: A method for wireless communication, comprising: receiving, from a security management component of the apparatus, an indication of an access point (AP); determining whether the AP has a security protocol enabled; selecting the AP to be used for connection to a network if the AP has the security protocol enabled; and connecting to the network via the AP based on the selection.

Aspect 22: The method of Aspect 21, wherein the security protocol comprises a simultaneous authentication of equals (SAE) Public Key (SAE-PK) protocol.

Aspect 23: The method of any of Aspects 21 to 22, wherein: the AP is one of a plurality of candidate APs; and the method further comprises, based on a determination that the AP indicated by the security management component does not have SAE-PK enabled, selecting one of the plurality of candidate APs for the connection to the network based on factors associated with each of the plurality of candidate APs.

Aspect 24: The method of any of Aspects 21 to 23, wherein the security management component comprises a supplication of a hardware abstraction layer of the apparatus.

Aspect 25: The method of any of Aspects 21 to 24, wherein the AP is selected via a driver of the apparatus.

Aspect 26: The method of any of Aspects 21 to 25, further comprising: receiving from the security management component, a request to perform an AP scan; scanning a medium to find a plurality of candidate APs in response to the request; and providing an indication of the plurality of candidate APs to the security management component, wherein the AP is one of the plurality of candidate APs.

Aspect 27. A non-transitory computer-readable medium having stored thereon instructions that, when executed by one or more processors, cause the one or more processors to perform operations according to any of Aspects 1 to 26.

Aspect 28: An apparatus for image processing, the apparatus comprising one or more means for performing operations according to any of Aspects 1 to 26.

What is claimed is:

1. An apparatus for wireless communication, comprising:

a memory; and one or more processors coupled to the memory, the one or more processors being configured to:

select an access point (AP) from a plurality of candidate APs based on multiple factors associated with each of the plurality of candidate APs, the multiple factors including at least a congestion factor and a security factor, wherein the security factor for the AP is based on an indication received from a supplicant of a hardware abstraction layer of the apparatus that the AP has a security protocol enabled, and wherein a weight associated with the security factor for selecting the AP is greater than a weight associated with the congestion factor; and connect to a network via the AP based on the selection.

2. The apparatus of claim 1, wherein, to select the AP, the one or more processors are configured to:

perform, for each of the plurality of candidate APs, a weighted sum of scores associated with each of the multiple factors to generate a total score for each of the plurality of candidate APs; and select the AP from the plurality of candidate APs based on the total score for the AP being a highest among the plurality of candidate APs.

3. The apparatus of claim 1, wherein, to select the AP, the one or more processors are configured to:

assign a score to the congestion factor, wherein a maximum of the score to be assigned to the congestion factor is equal to a reference score multiplied by the weight associated with the congestion factor;

assign a score to the security factor, wherein a maximum of the score to be assigned to the security factor is equal to a reference score multiplied by the weight associated with the security factor; and select the AP based on a total score including a sum of the score assigned to the congestion factor and the score assigned to the security factor.

4. The apparatus of claim 1, wherein the security protocol comprises a simultaneous authentication of equals Public Key (SAE-PK) protocol.

5. The apparatus of claim 4, wherein, to receive the indication, the one or more processors are further configured to receive, from the supplicant of the hardware abstraction layer of the apparatus, an indication that the AP supports the SAE-PK protocol.

6. The apparatus of claim 1, wherein the one or more processors are configured to scan a medium to find the plurality of candidate APs.

7. An apparatus for wireless communication, comprising:

a memory; and one or more processors coupled to the memory, the one or more processors being configured to:

receive, from a supplicant of a hardware abstraction layer of the apparatus, an indication of an access point (AP);

determine whether the AP has a security protocol enabled;

select the AP to be used for connection to a network if the AP has the security protocol enabled; and connect to the network via the AP based on the selection.

8. The apparatus of claim 7, wherein the security protocol comprises a simultaneous authentication of equals Public Key (SAE-PK) protocol.

9. The apparatus of claim 8, wherein:

the AP is one of a plurality of candidate APs; and based on a determination that the AP, as indicated by the supplicant of the hardware abstraction layer of the apparatus, does not have SAE-PK enabled, the one or more processors are further configured to select one of the plurality of candidate APs for the connection to the network based on factors associated with each of the plurality of candidate APs.

10. The apparatus of claim 7, wherein the one or more processors are configured to select the AP via a driver of the apparatus.

11. The apparatus of claim 7, wherein the one or more processors are configured to:

receive from the supplicant of the hardware abstraction layer of the apparatus, a request to perform an AP scan;

scan a medium to find a plurality of candidate APs in response to the request; and provide an indication of the plurality of candidate APs to the supplicant of the hardware abstraction layer of the apparatus, wherein the AP is one of the plurality of candidate APs.

12. A method for wireless communication at an apparatus, comprising:

selecting an access point (AP) from a plurality of candidate APs based on multiple factors associated with each of the plurality of candidate APs, the multiple factors including at least a congestion factor and a security factor, wherein the security factor for the AP is based on an indication received from a supplicant of a hardware abstraction layer of the apparatus that the AP has a security protocol enabled, and wherein a weight associated with the security factor for selecting the AP is greater than a weight associated with the congestion factor; and connecting to a network via the AP based on the selection.

13. The method of claim 12, wherein selecting the AP comprises:

performing, for each of the plurality of candidate APs, a weighted sum of scores associated with each of the multiple factors to generate a total score for each of the plurality of candidate APs; and selecting the AP from the plurality of candidate APs based on the total score for the AP being a highest among the plurality of candidate APs.

14. The method of claim 12, wherein selecting the AP comprises:

assigning a score to the congestion factor, wherein a maximum of the score to be assigned to the congestion factor is equal to a reference score multiplied by the weight associated with the congestion factor;

assigning a score to the security factor, wherein a maximum of the score to be assigned to the security factor is equal to a reference score multiplied by the weight associated with the security factor; and selecting the AP based on a total score including a sum of the score assigned to the congestion factor and the score assigned to the security factor.

15. The method of claim 14, further comprising scanning a medium to find the plurality of candidate APs.

16. The method of claim 12, wherein the security protocol comprises a simultaneous authentication of equals Public Key (SAE-PK) protocol.

17. The method of claim 16, wherein receiving the indication comprises receiving, from the supplicant of the hardware abstraction layer of the apparatus, an indication that the AP supports the SAE-PK protocol.

18. A method for wireless communication at an apparatus, comprising:

receiving, from a supplicant of a hardware abstraction layer of the apparatus, an indication of an access point (AP);

determining whether the AP has a security protocol enabled;

selecting the AP to be used for connection to a network if the AP has the security protocol enabled; and connecting to the network via the AP based on the selection.

19. The method of claim 18, wherein the security protocol comprises a simultaneous authentication of equals Public Key (SAE-PK) protocol.

20. The method of claim 19, wherein:

the AP is one of a plurality of candidate APs; and the method further comprises, based on a determination that the AP, as indicated by the supplicant of the hardware abstraction layer of the apparatus, does not have SAE-PK enabled, selecting one of the plurality of candidate APs for the connection to the network based on factors associated with each of the plurality of candidate APs.

21. The method of claim 18, wherein the AP is selected via a driver of the apparatus.

22. The method of claim 18, further comprising:

receiving from the supplicant of the hardware abstraction layer of the apparatus, a request to perform an AP scan;

scanning a medium to find a plurality of candidate APs in response to the request; and providing an indication of the plurality of candidate APs to the supplicant of the hardware abstraction layer of the apparatus, wherein the AP is one of the plurality of candidate APs.

* * * * *